(12) United States Patent
Kennedy et al.

(10) Patent No.: US 8,281,734 B2
(45) Date of Patent: Oct. 9, 2012

(54) WEB SEALING DEVICE

(75) Inventors: John Kennedy, Carrigaline (IE); Richard Sibbick, Cardiff (GB); Frank Swallow, Penarth (GB); Peter Dobbyn, Midleton (IE); Alan Hynes, Midleton (IE); John Brennan, Dungoruney (IE)

(73) Assignee: Dow Corning Ireland, Ltd., Midleton, Co. Cork (IE)

( * ) Notice: Subject to any disclaimer, the term of this patent is extended or adjusted under 35 U.S.C. 154(b) by 743 days.

(21) Appl. No.: 12/299,131

(22) PCT Filed: May 2, 2006

(86) PCT No.: PCT/GB2006/050088
§ 371 (c)(1),
(2), (4) Date: May 27, 2009

(87) PCT Pub. No.: WO2007/128946
PCT Pub. Date: Nov. 15, 2007

(65) Prior Publication Data
US 2009/0282621 A1    Nov. 19, 2009

(51) Int. Cl.
*B05C 11/00* (2006.01)
*C23C 16/50* (2006.01)
*B01J 19/08* (2006.01)
*H05H 1/24* (2006.01)

(52) U.S. Cl. ......... 118/68; 118/67; 118/723 R; 427/457; 427/532; 427/535

(58) Field of Classification Search .................. 118/718, 118/67, 68, 63, 58; 427/482, 549, 255.5, 427/248.1, 331, 346, 424
See application file for complete search history.

(56) References Cited

U.S. PATENT DOCUMENTS
2,657,457 A    11/1953    Toulmin, Jr.
(Continued)

FOREIGN PATENT DOCUMENTS
DE    3248730 A1    8/1983
(Continued)

OTHER PUBLICATIONS
English language abstract for WO 0174481 extracted from espacenet.com, dated Feb. 16, 2009.
(Continued)

*Primary Examiner* — Marianne L Padgett
*Assistant Examiner* — Nga Leung V Law
(74) *Attorney, Agent, or Firm* — Howard & Howard Attorneys PLLC

(57) ABSTRACT

An apparatus for treating a travelling web of material in a predetermined gaseous atmosphere comprising a chamber (1) through which a moving web of material (2) is transported from an inlet at a first end of the chamber (1) to an outlet at a second end and a means for introducing and controlling gas (5) intended to provide said predetermined gaseous atmosphere within said chamber (1), wherein said inlet and outlet each comprise a sealing means (4a, 4b) designed to enable passage of said web of material (2) therethrough whilst minimising the ingress of an external gas boundary layer (3) around said web of material (2) characterised in that said apparatus also comprises one or more re-circulation channels (7, 8) adapted to re-circulate gases within said chamber (1) from the second end of the chamber to the first end of the chamber thereby negating or substantially negating any pressure difference within the chamber (1) between said inlet and outlet. Said apparatus is preferably s part of a non thermal equilibrium plasma generating apparatus or corona discharge assembly.

15 Claims, 7 Drawing Sheets

U.S. PATENT DOCUMENTS

| | | | |
|---|---|---|---|
| 3,508,947 | A | 4/1970 | Hughes |
| 4,437,324 | A | 3/1984 | Sando et al. |
| 4,507,539 | A | 3/1985 | Sando et al. |
| 4,676,999 | A | 6/1987 | Furukawa et al. |
| 5,199,993 | A | 4/1993 | Edmonston et al. |
| 5,624,715 | A | 4/1997 | Gueggi et al. |
| 5,826,773 | A | 10/1998 | Straemke |
| 5,960,648 | A | 10/1999 | Straemke |
| 5,968,377 | A * | 10/1999 | Yuasa et al. .............. 219/121.41 |
| 5,976,630 | A | 11/1999 | Korokeyi et al. |
| 6,146,690 | A | 11/2000 | Kustermann |
| 6,743,478 | B1 | 6/2004 | Kiiha et al. |
| 2002/0182556 | A1 | 12/2002 | Baudry et al. |
| 2003/0116281 | A1* | 6/2003 | Herbert et al. ............. 156/379.6 |
| 2003/0145785 | A1 | 8/2003 | Bernert et al. |
| 2004/0112282 | A1 | 6/2004 | Metzger et al. |
| 2004/0231592 | A1* | 11/2004 | Izawa et al. ................... 118/718 |
| 2009/0300939 | A1 | 12/2009 | Kennedy et al. |

FOREIGN PATENT DOCUMENTS

| | | |
|---|---|---|
| EP | 0489978 A1 | 6/1992 |
| EP | 0527859 B1 | 7/1995 |
| EP | 0989455 A1 | 3/2000 |
| EP | 1134315 A2 | 9/2001 |
| WO | 0142542 A1 | 6/2001 |
| WO | WO 0174481 A1 | 10/2001 |
| WO | WO 0224987 A1 | 3/2002 |
| WO | WO 0228548 A2 | 4/2002 |
| WO | WO 0235576 A1 | 5/2002 |
| WO | WO 03053597 A1 | 7/2003 |
| WO | WO 03085693 A1 | 10/2003 |
| WO | WO 03086031 A1 | 10/2003 |
| WO | WO 2004068916 A1 | 8/2004 |

OTHER PUBLICATIONS

PCT International Search Report for PCT/GB2006/050088, dated Feb. 2, 2007, 4 pages.

Kanazawa et al. "Glow Plasma Treatment at Atmospheric Pressure for Surface Modification and film Deposition", Nuclear Instruments and Methods in Physics Research No. B37/38, 1989, pp. 842-845.

Kanazawa et al. "Stable Glow Plasma At Atmospheric Pressure", Letter to the Editor, J Phys. D: Appl. Phys. No. 21, 1988, pp. 838-840.

Okazaki et al. "Glow discharge Plasma at Atmospheric Pressure and Its Application", Proc. Jpn. Symp. Plasma Chem. vol. 2, 1989, pp. 95-102.

Yokoyama et al., "The Improvement of the Atmospheric-Pressure Glow Plasma Method and the Deposition of Organic Films", J. Phys. D: Appl. Phys., No. 23, 1990, pp. 374-377.

Kogelschatz, "Filamentary, Patterned, and Diffuse Barrier Discharges", IEEE Transactions on Plasma Science, vol. 30, No. 4, 2002, pp. 1400-1408.

Rahel et al., "The Transition From a Filamentary Dielectric Barrier Discharge . . . ", J. Phys. D: Appl. Phys. No. 38, 2005, pp. 547-554.

PCT International Search Report for PCT/GB2006/050089 dated Feb. 22, 2007, 4 pages.

English language abstract for EP 1134315 extracted from espacenet.com database, dated Feb. 23, 2009.

English language abstract for WO 0142542 extracted from espacenet.com database, dated Feb. 23, 2009.

* cited by examiner

WEB SEALING DEVICE

RELATED APPLICATIONS

This application claims priority to and all the advantages of International Patent Application No. PCT/GB2006/05088, filed on May 2, 2006.

The present invention relates to the use of a sealing mechanism to remove or greatly reduce the amount of gas in a gaseous boundary layer surrounding a moving web of material caused by the effect of friction as the web passes into a downstream process chamber in a different atmosphere.

A web is a moving substrate of flexible material such as woven and non-woven textiles, aggregated textile fibres, yarn, plastic films, metal foils and metal coils and the like. Commonly such webs are transported by means of a reel-to-reel type process.

In processes where it is necessary to treat a web of material in a specific gaseous atmosphere, typically an inert atmosphere containing an unreactive gas, it is necessary to exclude or at least minimise the introduction of polluting external gases such as oxygen/air entering a process chamber used for such a treatment. Whilst the use of seals or the like and a leak free process chamber substantially achieves this, in the case of treating web materials, the effect of friction or drag caused by the movement of the web through the external atmosphere can lead to the introduction of a thin boundary layer of gas, e.g. air on/adjacent to the surface of the web being drawn through the process chamber in the same direction as the web. Furthermore, when the web material is of a porous nature, fluids from the external atmosphere e.g. oxygen/air or water may additionally be trapped in the web material. The presence of such pollutants can have a negative effect on the results of the process being carried out in the process chamber.

Typically in the case of non-porous materials, simple seals are installed at the entrance and exit of the process chamber in which the required process takes place and a predetermined gas or gas mixture is injected into the chamber resulting in the required atmosphere for the required process to take place. The seals are used to create a barrier for incoming pollutants and escaping predetermined gas(es). However, the barrier to gas removal will also mean that pollutants entering the chamber are potentially also prevented from leaving the chamber. Since no sealing system is perfect, a certain amount of the predetermined gas will need to be continuously or periodically supplied to ensure that the atmosphere within the process chamber is maintained constant. Hence, once sealed, the chamber is purged to produce the required atmosphere and is often subsequently subjected to a further continuous or periodic introduction of the predetermined gas to maintain the required atmosphere and make up for any losses of predetermined gas.

Whilst resident in the process chamber region a moving web will continue to induce a drag flow on the surrounding gas be it a pollutant or otherwise. In a chamber of sufficient dimensions, this drag flow will establish a re-circulation pattern of gas along the web surface and back to the inlet seal through regions of the process chamber remote from the effects of the drag caused by movement of the web, examples of this type of system might include curtain coating apparatus where the curtain coating unit is provided for treating the web surface within the process chamber. However, in cases where the process chamber is necessarily narrow, such as plasma treatment systems requiring a gap of less than say about 25 mm between walls parallel to the web (e.g. in the case of plasma systems the parallel electrodes applying a potential to generate the plasma required to treat the web) the distance between the web and the boundary walls of the process chamber become almost negligible e.g. 5 mm resulting in the substantial prevention of the free re-circulation of gas back to the inlet. In this case, areas of differing pressure are created at the entry and exit of the process chamber. This pressure differential leads to and causes increasing amounts of pollutants to be dragged into the system past the entry seal so reducing its efficiency.

One major problem perceived in the prior art, even in comparatively large process chambers required for curtain coating processes, is that because the boundary layer is caused due to drag or friction, as the velocity of the web through the chamber increases the effect of the boundary layer becomes more acute. This can be seen particularly in the case of curtain coating apparatus because where coatings are applied to webs moving at a velocity of greater than about 150m min$^{-1}$ the coating process is negatively effected because the "curtain" of liquid used in the coating process is deformed by the boundary layer resulting in irregular coating of the substrate, for example, as the displacement is non-uniform the curtain of liquid may assume an almost wave-like pattern across the web.

A number of solutions for negating the effect of the boundary layer have been proposed particularly in relation to the application of liquids on to moving substrates, particularly in relation to curtain coating processes.

U.S. Pat. Nos. 3,508,947 and 5,976,630 describe differing applications of air shields. In U.S. Pat. No. 3,508,947 the boundary layer is removed by the provision of an air shield comprising a vacuum manifold positioned adjacent to the substrate web to draw off the boundary layer before it reaches the curtain, thereby shielding the curtain from the effects of the boundary layer. In U.S. Pat. No. 5,624,715 air in the boundary layer is drawn off from both the boundary layer of the substrate and the boundary layer caused by the curtain. U.S. Pat. No. 6,743,478 and US2004/0112282 describe the use of suction apparatus to remove the boundary layer from a moving substrate.

U.S. Pat. No. 6,146,690 describes a method of applying a coating for a moving planar substrate involving an interruption of the boundary layer by controlling the dynamic pressure near the curtain coating wetting line by providing a dynamic air pressure sensor in the vicinity of the wetting line which is adapted to actuate a suction device as and when required to maintain the dynamic pressure at a predetermined value. EP 0489978 identified that the pressure difference between ambient air and the inside of the air shield has to be high enough to evacuate the boundary layer of air adhering to the web but needs to be limited to avoid an air flow in a direction from the coating curtain towards the air shield against the movement of the substrate because such an air flow leads to at least part of the curtain to be sucked into the air shield. WO 03/053597 describes a method and apparatus for curtain coating involving the use of an air shield and an air supply near the dynamic wetting line which is moved against the moving direction of the substrate and boundary air layer of the substrate.

US2003/0145785 describes a curtain coating process using an attenuation device upstream of the coating region in the form of a sealing element pressed against the substrate surface and rolls thereon without slippage. The attenuation device may comprise an electrode arrangement or ultrasound source. In the applicant's view none of the above are suitable for the process chambers of confined size envisaged in the present invention for processes such as plasma treatments in which the web has to pass through plasmas generated between parallel electrodes which need to be a short distance apart in order to generate the plasma.

WO02/24987 describes a high speed yarn finishing apparatus and method whereby the boundary is said to be blocked from entry into the apparatus. EP0989455 describes an apparatus for the continuous treatment of sheet material under reduced pressure comprising a housing through which a web type substrate may pass from an entrance to an exit both of which are sealed by drive rollers. A series of pairs of rollers are used to maintain the passage of the substrate through the housing and rotatable sealing means are provided to seal each drive roller thereby forming sealed chambers between adjacent pairs of drive rollers which are used as treatment cells under reduced pressure for applying liquid coatings by curtain coating applications or continuously plasma treating a continuous substrate under vacuum as described in EP0527859.

The present invention is particularly directed to continuous web treatment methods using non-thermal equilibrium plasma techniques at substantially atmospheric pressure or under vacuum. Plasma is sometimes referred to as the fourth state of matter. When matter is continually supplied with energy, its temperature increases and it typically transforms from a solid to a liquid and, then, to a gaseous state. Continuing to supply energy causes the system to undergo yet a further change of state in which neutral atoms or molecules of the gas are broken up by energetic collisions to produce negatively charged electrons, positive or negatively charged ions and other excited species which mix of particles exhibiting collective behaviour is a plasma. Due to their electrical charge, plasmas are highly influenced by external electromagnetic fields, which makes them readily controllable. Furthermore, their high energy content allows them to achieve processes which are impossible or difficult through the other states of matter, such as by liquid or gas processing.

The term "plasma" covers a wide range of systems whose density and temperature vary by many orders of magnitude. Some plasmas are very hot and all their microscopic species (ions, electrons, etc.) are in approximate thermal equilibrium, the energy input into the system being widely distributed through atomic/molecular level collisions, examples include a flame and plasma spray techniques involving the blasting of surfaces with molten solids at very high temperatures. Other plasmas, however, such as those at low pressure (e.g. 100 Pa) where collisions are relatively infrequent, have their constituent species at widely different temperatures and are called "non-thermal equilibrium" plasmas. In these non-thermal plasmas, free electrons are very hot with temperatures of many thousands of Kelvin (K) whilst the neutral and ionic species remain cool. Because the free electrons have almost negligible mass, the total system heat content is low and the plasma operates close to room temperature thus allowing the processing of temperature sensitive materials, such as plastics or polymers, without imposing a damaging thermal burden onto the sample. However, the hot electrons create, through high energy collisions, a rich source of radicals and excited species with a high chemical potential energy capable of profound chemical and physical reactivity.

Non-thermal equilibrium plasma processes are ideal for the coating of substrates in the form of delicate and heat sensitive webbed materials because generally the resulting coatings are free of micropores even with thin layers. The optical properties, e.g. colour, of the coating can often be customised and plasma coatings adhere well to even non-polar materials, e.g. polyethylene, as well as steel (e.g. anti-corrosion films on metal reflectors), textiles, etc.

One type of plasma is generally referred to as diffuse dielectric barrier discharge (diffuse DBD), one form of which can be referred to as an atmospheric pressure glow discharge (Sherman, D. M. et al, J. Phys. D.; Appl. Phys. 2005, 38 547-554)). This term is generally used to cover both glow discharges and dielectric barrier discharges whereby the breakdown of the process gas occurs uniformly across the plasma gap resulting in a homogeneous plasma across the width and length of a plasma chamber. (Kogelschatz, U. 2002 "Filamentary, patterned, and diffuse barrier discharges" IEEE Trans. Plasma Sci. 30, 1400-8) These may be generated at both vacuum and atmospheric pressures. It is essential that such systems have minimal arcing between electrode surfaces. Preferably arcing is completely prevented. In the case of atmospheric pressure diffuse dielectric barrier discharges, gases including helium, argon or nitrogen are utilised as process gases for generating the plasma and a high frequency (e.g. >1 kHz) power supply is used to generate a homogeneous or uniform plasma between the electrodes at atmospheric pressure. The exact mechanism of formation of diffuse DBD is still a matter of debate but there is mounting evidence that Penning ionisation plays a critical role, in combination with secondary electron emission from the cathode surface. (see for example, Kanazawa et al, J. Phys. D: Appl. Phys. 1988, 21, 838, Okazaki et al, Proc. Jpn. Symp. Plasma Chem. 1989, 2, 95, Kanazawa et al, Nuclear Instruments and Methods in Physical Research 1989, B37/38, 842, and Yokoyama et al., J. Phys. D: Appl. Phys. 1990, 23, 374).

Atmospheric pressure plasmas offer industry open port or perimeter systems providing free ingress into and exit from the plasma region by e.g. webbed substrates and, hence, on-line, continuous processing of large or small area webs or conveyor-carried discrete workpieces. Throughput is high, reinforced by the high species flux obtained from high pressure operation. Many industrial sectors, such as textiles, packaging, paper, medical, automotive, aerospace, etc., rely almost entirely upon continuous, on-line processing so that open port/perimeter configuration plasmas at atmospheric pressure offer a new industrial processing capability.

Systems which generate locally intense electric fields, i.e. non-uniform electric fields generated using point, edge and/or wire sources are conventionally described as corona discharge systems. Corona discharge systems have provided industry with an economic and robust means of surface activation for more than 30 years. However, there are no corona discharge systems commercially available demonstrating uniform deposition. This is because such corona discharge systems have significant limitations when applied to deposition processes. They typically operate in ambient air resulting in an oxidative deposition environment, which renders control of deposition chemistry difficult. The design of corona discharge systems is such as to generate locally intense discharges which result in variations in energy density across the process chamber. In regions of high energy density the substrate is prone to damage from the discharge whereas in low energy density areas the treatment rate is limited. Attempts to increase the treatment rate in the low energy density areas result in unacceptable levels of substrate or coating damage in the high energy regions. These variations in energy density lead to non-uniform deposition chemistry and/or non-uniform deposition rate across the process chamber. In addition the corona process is incompatible with thick webs or 3D workpieces.

Flame treatment systems are examples of thermal equilibrium plasmas. They operate at high gas temperature and are oxidative by nature which means they have significant limitations when applied to deposition processes. In such high temperature gases it is impossible to maintain the chemical structure and/or functionality of the precursor in the deposited coatings. In addition the high process temperatures are incompatible with heat sensitive substrates.

Whilst the prior art has generally concentrated on means for overcoming problems caused by air boundary layers on a web very little research appears to have been undertaken with respect to the avoidance of the ingress of gaseous pollutants such as air or an alternative reactive gas in a downstream process which is required to take place in an alternative atmosphere. The inventors of the present invention have identified a means of reducing the effect and size of a boundary layer being transported into a controlled atmosphere by negating or at least minimizing the pressure difference between the entrance and exit of a process chamber through which a web passes in a controlled atmosphere.

In accordance with the present invention there is provided an apparatus for treating a travelling web of material in a predetermined gaseous atmosphere comprising a chamber through which a moving web of material is transported from an inlet at a first end of the chamber to an outlet at a second end of the chamber and a means for introducing and controlling gas intended to provide said predetermined gaseous atmosphere within said chamber, wherein said inlet and outlet each comprise a sealing means designed to enable passage of said web therethrough whilst minimising the ingress of an external gas boundary layer around said material characterised in that said apparatus also comprises one or more re-circulation channels adapted to re-circulate gases within said chamber from the second end of the chamber to the first end of the chamber thereby negating or substantially negating any pressure difference within the chamber between said inlet and outlet.

An apparatus for treating a travelling web of material in a predetermined gaseous atmosphere, the apparatus comprising:
- a process chamber having an inlet at a first end of the chamber and an outlet at a second end of the chamber wherein said inlet and outlet each comprise a sealing means designed to enable passage of a web of material therethrough whilst minimising the ingress of an external gas boundary layer around said material;
- a means for introducing and controlling gas intended to provide said predetermined gaseous atmosphere within said chamber, and
- one or more re-circulation channels for re-circulating gases within said chamber from the second end of the chamber to the first end of the chamber thereby substantially negating any pressure difference within the chamber between said inlet and outlet.

For the sake of this invention the term "substantially negating any pressure difference" (and derivatives thereof) is intended to cover the situation where the use of the channels in accordance with the present invention either completely or almost completely reduces the pressure difference between the inlet and outlet to zero i.e. where a minimal pressure difference occurs between the inlet and the outlet, Hence preferably when comparing two pieces of identical equipment other than the fact that one comprises the channels as hereinbefore described, the equipment containing the channels has a pressure difference between the inlet and outlet thereof of no more than 10% and preferably no more than 5% of the pressure difference between the inlet and outlet generated in the equipment without the aforementioned channels.

Preferably the predetermined gaseous atmosphere is an inert atmosphere. Any suitable inert gases may be utilized. Examples include helium, argon, nitrogen, and mixtures of two or more thereof and argon based mixtures additionally containing ketones and/or related compounds. These gases may be utilized alone or in combination with potentially reactive gases such as, for example, ammonia, $O_2$, $H_2O$, $NO_2$, $CO_2$ air or hydrogen in predefined ratios determined by the process being undertaken within the chamber.

The gas forming the boundary layer surrounding the web prior to entry into the chamber and which is generally drawn into the chamber due to the effects of drag or friction may be any gas or gas mixture forming the atmosphere through which the web is drawn external to the chamber. Therefore unless the web has been pre-treated this will typically be air but may typically include any other gas present in the external atmosphere in through which the web is transported prior to entering the process chamber.

Any suitable combination of seals may be utilized to form the sealing means defining the inlet of the process chamber and the sealing means defining the outlet of the process chamber in which the web is treated in a controlled atmosphere. Each sealing means may, for example, comprise fixed sealing members or may be in the form of pairs of rollers between which, in use, the web passes in order to enter or exit the process chamber. The seals may alternatively be standard lip seals, which may not be suitable for some web materials including those which are easily scratched and/or delicate materials which are easily damaged. A further alternative is to use pinch rollers which are well known for being effective at removing entrained air in materials passing therethrough. The pinch rollers may comprise a solid hard surface or a rubberized soft surface to improve sealing and may be free running or driven to reduce friction. A still further alternative may comprise the use of pinch rollers together with one or more vacuum rollers. This method has the benefit of the use of pinch rollers together with a reduction in overall size and complexity of the sealing rollers. When using pinch rollers on wide area webs, the diameter and size of the rollers will become significant.

The seals may be of the type described in EP 0 989 455 A1 comprising pinch rollers in series to produce zones of differing pressure between sets of rollers. These pinch rollers are themselves sealed against a smaller roller which in turn seals against a wear pad. An alternative to the wear pad is the use of standard lip seals. Either design allows for significant pressure to be used on the pinch rollers to ensure minimum gas (air) entrainment. The low amount of gas (air) entrainment and minimal leakage ensures that the required pressure environment desired between sets of pinch rollers is achieved and maintained. The seals are used to create a barrier for incoming gas (air) and escaping gas from the controlled atmosphere respectively. Since no sealing system is perfect, a certain amount of the gas/gas mixture required to form the required atmosphere may need to be continuously or periodically supplied to ensure that the atmosphere within the inert chamber is maintained constant.

In use as a web material enters the chamber through the sealing members a thin boundary layer of gas, typically air, on the surface of the material is drawn by the movement of the web into and through chamber in the same direction as the web. Once past the inlet seal the moving substrate will induce a drag flow on the surrounding gas. This drag flow will establish a re-circulation pattern of gas along the substrate surface and back to the inlet seal through the re-circulation channels in accordance with the present invention. The re-circulation channels of the present invention prevent or minimize the pressure differences between the inlet and outlet thereby reducing/minimizing the amount of external gas being dragged into the chamber by minimizing the relative pressure reduction at the inlet compared to the outlet of the chamber which occurs in prior art systems thereby maintaining the efficiency of the inlet seal. Typically the drag effect causing the relative pressure difference between the inlet and outlet starts to occur when the distance between the chamber walls, which are parallel to the web as it passes through the chamber, are less than 15 cm apart. As the distance between said walls decreases the relative pressure difference becomes increasingly apparent such that when the distance between the walls is less than 2 cm and the thickness of the web is up to 80% of the distance between the walls, such as potentially in the case of a web passing between parallel electrodes in a diffuse dielectric barrier discharge plasma system as discussed below, the drag effect within the chamber is significant and substantially little of the process gas is able to return to the entrance once dragged through the process chamber by means of the web.

It will be appreciated that the provision of the re-circulation channels in accordance with the present invention enables many processes particularly continuous plasma coating processes, to be undertaken at much higher speeds than would otherwise be possible because of the significant reduction in the amount of external gas dragged through the inlet by the web. This has a two fold advantage over the prior art in that the amount/percentage of the gas in the chamber will vary significantly less and will contain a much greater percentage of the required gas. It will mean that significantly less required gas will be wasted purging the system to remove external gas and that substantially all the boundary layer will comprise the required gas. Each of these advantages results in better quality coatings on the web being coated in the chamber. Coatings may be applied at speeds of up to and even greater than about 150m min$^{-1}$ as the deformations commonly associated with the effects of the boundary layer are substantially avoided.

Any number of re-circulation channels may be provided. In the case of a porous web a single re-circulation channel or a series of re-circulation channels on one side of the web is preferred. For non-porous webs, where gas cannot pass readily through the web matrix, it is preferred that there are at least two re-circulation channels one on either side of the web.

When treating porous webs in the chamber, particularly with respect to non-thermal equilibrium plasma processing applications such as diffuse dielectric barrier discharge (as hereinbefore described), the use of a single re-circulation channel or a series of re-circulation channels on one side of the web has several advantages over having re-circulation channels on both sides of the web. These include the fact that the use of one or more re-circulation chambers on one side of the web will result in required gas (e.g. helium) and (when present) reactive agent being drawn through the web towards and subsequently through the re-circulation channel(s) thereby enhancing the efficiency of the coating process and minimising the loss of reactive agents. Furthermore, the extraction of residual reactive agent through the re-circulation channel(s) may render the coating process more efficient particularly for example where the chamber is adapted for use as a non-thermal equilibrium plasma generation chamber (e.g. diffuse DBD) with more than one plasma being generated in the process chamber, particularly if the primary treatment region of the web is the second plasma zone through which the web passes as this will result in residual (if any) reactive agent being drawn through the re-circulation channels and then being re-plasma treated and used in the form of a coating material in the first plasma region.

Whilst losses in required gas may occur they will be significantly reduced. However, as before, required gas may be added into the chamber to make up for losses. Additionally, a purge system may be employed to remove a portion of the gas and so prevent the build up in concentration of external gases drawn in by the web (typically air) that may have leaked past the inlet seal.

A further problem which the inventors have sought to overcome is the problem of removal of external fluids, typically gases and liquids such as air and solvents/water respectively trapped within the matrix of porous webs entering the processing chamber such as the ones hereinbefore described.

The apparatus in accordance with the present invention may therefore also comprise an intermediate chamber upstream of the previously described chamber (henceforth the latter shall be referred to as the process chamber) which intermediate chamber comprises a purging means for purging the travelling web of porous material with required gas prior to entry in the process chamber to replace fluid trapped in the porous web upon entry into the intermediate chamber with required gas prior to entry of the web into the process chamber and a gas removing means for extracting the fluids purged out of the porous web.

The intermediate chamber may be formed merely by the introduction of an additional seal system through which the web must travel upstream of the process chamber. Preferably any suitable sealing system as hereinbefore described may again be utilized to form the inlet to the intermediate chamber. In one embodiment the outlet seal of the intermediate chamber may additionally function as the inlet seal of the process chamber. Preferably the seal separating the intermediate chamber and the process chamber is positioned such that prior to entry into the process chamber entrained external gas is replaced with gas to be used in the predetermined atmosphere, typically an inert gas, by injecting inert gas into the intermediate chamber and extracting the residual required gas/fluid mixture by suitable extraction means. Preferably the gas injection and extraction means are positioned on opposite sides of the web so as to ensure a gas pathway towards, through and subsequently away from the web.

The fluid extracted from the web may comprise any fluid trapped in the web prior to entry into the intermediate chamber for example it may be air or oxygen or some other gas from a previous treatment or may be a liquid such as a solvent with which the web was cleaned prior to treatment or merely water or the like.

The use of a single intermediate chamber may enable sufficient fluid removal from the web matrix. However, the removal of substantially all traces of an external fluid such as oxygen may be required for some applications as its presence could negatively affect the results of the process being undertaken in the process chamber. In such instances a series of intermediate chambers is preferred.

When multiple intermediate chambers are provided they may be interlinked such that the outlet seal of one intermediate chamber forms the inlet chamber of its neighbour. The supply of required gas and removal of required gas/extracted fluid through each intermediate chamber may be completely independent of other intermediate chambers and the process chamber but preferably the supply and extraction of required gas in the process chamber is independent of the supply and extraction in the intermediate chambers but the intermediate chambers are so linked by one or more channels that pure required gas is introduced into the intermediate chamber neighbouring the process chamber and is then passed through the other intermediate chambers in series as they progress away from the chamber so as to provide a counter-current of required gas moving through the intermediate chambers in the opposite direction to the direction of passage of the web therethrough. This counter current of required gas ensures that the web passes through a greater concentration of required gas in each intermediate chamber as it approaches the processing chamber in order that increasingly reduced concentrations of fluid(s) is/are present in the intermediate chambers. Hence the external gas/required gas mixture is then drawn off for by means of a suitable extraction means from the intermediate chamber through which the web first passes.

The extracted gas may then be transported to a suitable separating system for separation and regeneration of the required gas, thereby minimizing loss of the required gas to the atmosphere.

It will be appreciated that for the purpose of required gas regeneration from a porous web the reverse process may be undertaken in a post-process chamber downstream of the process chamber to remove trapped required gas from the web, replacing it typically with air or in the case of a multi-step process with a second required gas. The latter process is particularly useful where the required gas is expensive. Furthermore, in such a reverse process the gas mixture extracted from the counter-current process in the series of intermediate chambers may be utilized as the counter-current gas used in the post-process chamber replacement of required gas with external gas. The resulting external gas/required gas mixture being transported to a suitable separating system for separation and regeneration.

Hence a series of external gas removal chambers may be set up for multiple process web treatments or alternatively the web may be passed through the system in one direction for a first coating and then passed through the system in a reverse direction whereby the post-process chambers in the first pass of the web become the intermediate chambers in the second pass and vice versa. The required gas for treatment of the second coating may be changed and the direction of gas flow reversed. Obviously this means that the intermediate chambers in the first passage are then used as the post-process extraction chambers. Modular construction of intermediate chambers and seals can allow for multiple counter current assemblies to be installed and uninstalled as required for the process being undertaken in the process chamber.

In one embodiment of the present invention when using a porous web, such a web may be transported around a roller in an intermediate or post-process chamber in such a way that the direction in which the web is travelling changes by approximately 90° (i.e. upon leaving the roller the direction of the web is approximately perpendicular to the direction of approach of the web to the roller. The inventors have identified that engagement of the web with such a roller tends to have a "squeeze" effect on the "pores" within the web forcing trapped external gas out from the pores in the web. Furthermore by introducing required gas into the chamber directed into the gap between the roller and the web immediately prior to web/roller interconnection, then the replacement of unwanted gas by required gas is enhanced. The inventors have found that only a single roller is required to have such an effect but such a process may be further enhanced by the provision of a second roller which effectively causes a pinch with the first roller on the web preferably after the web has moved through 90°. The pinch effect would prevent or at least reduce the drag effect on the external gas. In a still further embodiment of the present invention each pre-process and post-process chamber inlet and/or outlet may be designed to transport the web in this manner as will be described in further detail in the Figures below.

In a further embodiment of the present invention the counter current system may comprise a part of a vacuum nip roller system such that the roller acts both as the means of extracting fluid from a porous web and the means of blocking or substantially blocking the ingress of the external gas boundary layer around the web. In one preferred option the vacuum nip roller may be sized so as to be function as the lead roller for both the inlet and outlet of the process chamber, and preferably to contain the intermediate chambers of the present invention for required gas exchange purposes both before and after treatment in the process chamber. The utilization of such a roller provides the user with the additional reassurance that the web being transported into the process chamber is travelling at the same speed as the treated web subsequent to treatment in the process chamber. This solves a particularly difficult problem that is often observed in systems of this type in that even miniscule differences in inlet nip roller speed and outlet nip roller speed can result in the damaging or tearing of the web particularly in respect of delicate webs.

Hence preferably more than one gas may be supplied to the intermediate and post-process chambers as required. The latter processes might be envisaged when for example it is essential to exclude air and typically oxygen from the first processing/coating step but then a second coating step involving an oxidation step in which a different required gas is required in the processing chamber.

The required gas may be any gas or mixture of gases required to form the atmosphere within the processing in chamber.

Systems in accordance with the present invention for use with porous webs comprise the recirculation system to equilibrate the pressure in the process chamber in and optionally both intermediate chambers for removal of external gas from the web and post-process chambers for extraction of the required gas for its regeneration and reuse.

The general concepts used in accordance with the present invention may be utilized in any apparatus and process for treating a webbed material in a predetermined atmosphere such as curtain coating, paper treatment processes and continuous plasma and corona discharge treatment processes. In particular the apparatus and method described in the present application is particularly intended for use in continuous non-thermal equilibrium plasma treatment apparatus (e.g. diffuse DBD such as glow discharge of the type described in WO 03/086031 and WO 02/28548 and the like) and/or suitable corona discharge apparatus.

For typical non-thermal equilibrium plasma generating apparatus, the plasma is generated between a pair of electrodes within a gap of from 3 to 50 mm, for example 5 to 25 mm and as such has particular utility for coating webs of material. The generation of steady-state diffuse dielectric barrier discharge at atmospheric pressure such as a glow discharge plasma is preferably obtained between adjacent electrodes which may be spaced up to 5 cm apart, dependent on the process gas used. Typically however the distance between the electrodes is less than 2 cm and most preferably less than 1 cm and as such will be potentially negatively affected by the gradual increase with time of a pressure differential between an inlet and outlet for a web of material passing between electrodes of such a geometry. The discharge is generated by the uniform breakdown of the process gas across the plasma region between the electrodes resulting in a homogeneous plasma across the width and length of the plasma chamber. The plasma is generated between two planar parallel high voltage electrodes at least one of which is covered with a dielectric barrier. The geometry of the electrodes is such as to ensure uniform electric field in the plasma region.

The electrodes being radio frequency energised with a root mean square (rms) potential sufficient to ignite and sustain a discharge between the electrodes in the range of 1 to 100 kV, preferably between 1 and 30 kV at 1 to 100 kHz, preferably at 10 to 50 kHz. The voltage used to form the plasma will typically be between 1 and 30 kVolts, most preferably between 2.5 and 10 kV however the actual value will depend on the chemistry/gas choice and plasma region size between the electrodes.

Any suitable electrode systems may be utilised. Each electrode may comprise a metal plate or metal gauze or the like retained in a dielectric material or may, for example, be of the type described in the applicants co-pending application WO 02/35576 wherein there are provided electrode units containing an electrode having an adjacent dielectric plate and a cooling liquid distribution system for directing a cooling conductive liquid onto the exterior of the electrode to cover a planar face of the electrode. Each electrode unit of this type typically comprises a watertight box one side of which being a dielectric plate to which a metal plate or gauze electrode is attached on the inside of the box. There is also a liquid inlet and a liquid outlet fitted to a liquid distribution system comprising a cooler and a recirculation pump and/or a sparge pipe incorporating spray nozzles. The cooling liquid (preferably water or an aqueous salt solution) covers the face of the electrode remote from the dielectric plate. The dielectric plate extends beyond the perimeter of the electrode and the cooling liquid is also directed across the dielectric plate to cover at least that portion of dielectric bordering the periphery of the electrode. The water acts to electrically passivate any boundaries, singularities or non-uniformity in the metal electrodes such as edges, corners or mesh ends where the wire mesh electrodes are used.

Alternatively at least one electrode may be of the type described the applicants co-pending application WO 2004/068916 in which the electrode comprises a housing having an inner and outer wall, wherein at least the inner wall is formed from a dielectric material. The housing is adapted to contain an at least substantially non-metallic electrically conductive material in direct contact with the inner wall. Electrodes of this type are preferred for generating a diffuse dielectric barrier Discharge such as a glow discharge, as the resulting discharge is homogenous, significantly reducing inhomogeneities when compared to systems utilizing metal plate electrodes. Preferably, the non-metallic electrically conductive material is in direct contact with the inner wall of the electrode.

Any suitable dielectric materials may be used, examples include but are not restricted to polycarbonate, polyethylene, glass, glass laminates, epoxy filled glass laminates and the like. Preferably, the dielectric has sufficient strength in order to prevent any bowing or disfigurement of the dielectric by the conductive material in the electrode. Preferably, the dielectric used is machinable and is provided at a thickness of up to 50 mm in thickness, more preferably up to 40 mm thickness and most preferably 15 to 30 mm thickness. In instances where the selected dielectric is not sufficiently transparent, a glass or the like window may be utilized to enable diagnostic viewing of the generated plasma.

The non-metallic electrodes may be spaced apart by means of a spacer or the like, which is preferably also made from a dielectric material which thereby effects an increase in the overall dielectric strength of the system by eliminating any potential for discharge between the edges of the conductive liquid.

The substantially non-metallic electrically conductive material may be a polar solvent for example water, alcohol and/or glycols or aqueous salt solutions and mixtures thereof, but is preferably an aqueous salt solution. When water is used alone, it preferably comprises tap water or mineral water. Preferably, the water contains up to a maximum of about 25% by weight of a water soluble salt such as an alkali metal salt, for example sodium or potassium chloride or alkaline earth metal salts.

Alternatively, the substantially non-metallic electrically conductive material may be a conductive polymer paste compositions. Such pastes are currently used in the electronics industry for the adhesion and thermal management of electronic components and have sufficient mobility to flow and conform to surface irregularities.

Suitable pastes may include silicones, polyoxypolyolefin elastomers, a hot melt based on a wax such as a, silicone wax, resin/polymer blends, silicone polyamide copolymers or other silicone-organic copolymers or the like or epoxy, polyimide, acrylate, urethane or isocyanate based polymers. The polymers will typically contain conductive particles, typically of silver but alternative conductive particles such as gold, nickel, copper, assorted metal oxides and/or carbon including carbon nanotubes; or metallised glass or ceramic beads may be used.

One major advantage of the use of liquids for conducting materials is that each pair of electrodes can have a different amount of liquid present in each electrode resulting in a different sized plasma zone and therefore, path length and as such potentially a different reaction time for a substrate when it passes between the different pairs of electrodes. This might mean that the period of reaction time for a cleaning process in the first plasma zone may be different from path length and/or reaction time in the second plasma zone when a coating is being applied onto the substrate and the only action involved in varying these is the introduction of differing amounts of conducting liquid into the differing pairs of electrodes. Preferably, the same amount of liquid is used in each electrode of an electrode pair where both electrodes are as hereinbefore described.

One example of the type of assembly which might be used on an industrial scale with electrodes in accordance with the present invention is wherein there is provided an atmospheric pressure plasma assembly comprising at least a first and second pair of parallel spaced-apart electrodes. The spacing between inner plates of each pair of electrodes forms a first and second plasma zone respectively and the assembly further comprises a means of transporting a substrate successively through said first and second plasma zones and an atomiser adapted to introduce an atomised liquid or solid coating making material into one of said first or second plasma zones. The basic concept for such equipment is described in the applicant's co-pending application WO 03/086031 which is incorporated herein by reference.

In a preferred embodiment, the electrodes are vertically arrayed. It should be understood that the term vertical is intended to include substantially vertical and should not be restricted solely to electrodes positioned at exactly 90° to the horizontal.

Whilst the atmospheric pressure discharge assembly may operate at any suitable temperature, it preferably operates at a temperature between room temperature (20° C.) and 70° C. and is typically utilized at a temperature in the region of 30 to 50° C.

Materials to be coated onto the web may be introduced into the process chamber by any suitable means in the form of a gas, liquid or solid. Preferably, liquid and solid materials for coating the webs are introduced using the delivery system described in WO 02/28548, wherein liquid based polymer precursors are introduced in the form of an aerosol of liquid droplets into an atmospheric plasma discharge or the excited species resulting therefrom. Furthermore the coating-forming materials can be introduced into the plasma discharge or resulting stream in the absence of a carrier gas, i.e. they can be introduced directly by, for example, direct injection, whereby the coating forming materials are injected directly into the plasma.

The coating-forming material may be atomised using any suitable atomiser. Preferred atomisers include, for example, ultrasonic nozzles, i.e. pneumatic or vibratory atomisers in which energy is imparted at high frequency to the liquid. The vibratory atomisers may use an electromagnetic or piezoelectric transducer for transmitting high frequency oscillations to the liquid stream discharged through an orifice. These tend to create substantially uniform droplets whose size is a function of the frequency of oscillation. The material to be atomised is preferably in the form of a liquid, a solid or a liquid/solid slurry. The atomiser preferably produces a coating-forming material drop size of from 10 to 100 µm, more preferably from 10 to 50 µm. Suitable ultrasonic nozzles which may be used include ultrasonic nozzles from Sono-Tek Corporation, Milton, N.Y., USA or Lechler GmbH of Metzingen Germany. Other suitable atomisers which may be utilised include gas atomising nozzles, pneumatic atomisers, pressure atomisers and the like The apparatus of the present invention may include a plurality of atomisers, in the process chamber which may be of particular utility, for example, where the apparatus is to be used to form a copolymer coating on a substrate from two different coating-forming materials, where the monomers are immiscible or are in different phases, e.g. the first is a solid and the second is gaseous or liquid.

The required gas of the present invention as used in this embodiment is the process gas used to generate a plasma. Any gas suitable to generate an appropriate plasma for use in the present invention may be used but is preferably an inert gas or inert gas based mixture such as, for example helium, argon, nitrogen, and mixtures of two or more thereof and argon based mixtures additionally containing ketones and/or related compounds. These process gases may be utilized alone or in combination with potentially reactive gases such as, for example, ammonia, $O_2$, $H_2O$, $NO_2$, $CO_2$, air or hydrogen in predefined ratios determined by the process being undertaken within the chamber. Most preferably, the process gas will be Helium alone or in combination with an oxidizing or reducing gas. The selection of gas depends upon the plasma processes to be undertaken. When an oxidizing or reducing process gas is required, it will preferably be utilized in a mixture comprising 90-99% noble gas and 1 to 10% oxidizing or reducing gas. It will be appreciated therefore that the ability to reuse such expensive gases results in a major economic saving for the user.

Under oxidising conditions the present method may be used to form an oxygen containing coating on the substrate. For example, silica-based coatings can be formed on the substrate surface from atomised silicon-containing coating-forming materials. Under reducing conditions, the present method may be used to form oxygen free coatings, for example, silicon carbide based coatings may be formed from atomised silicon containing coating forming materials. Hence when one wishes to be selective as to the type of predetermined atmosphere it is very important to minimise the ingress of external gases such as air into the system to avoid unwanted oxidation of coatings applied to the web.

In a nitrogen containing atmosphere nitrogen can bind to the substrate surface, and in an atmosphere containing both nitrogen and oxygen, nitrates can bind to and/or form on the substrate surface. Such gases may also be used to pre-treat the substrate surface before exposure to a coating forming substance. For example, oxygen containing plasma treatment of the substrate may provide improved adhesion with the applied coating. The oxygen containing plasma being generated by introducing oxygen containing materials to the plasma such as oxygen gas or water.

In one embodiment, the web substrate of the present invention may be coated with a plurality of layers of differing composition. These may be applied by passing the substrate through a series of different process chambers or by repeatedly passing the substrate or partially coated substrate repeatedly through a process chamber. Any suitable number of cycles or process chambers may be utilised in order to achieve the appropriate multi-coated substrates.

For example, the substrate utilised in accordance to the present invention may be subjected to a plurality of process chambers and/or plasma, each of which can function differently e.g. a first plasma region might be utilised as a means of oxidising the substrate surface in for example, an oxygen/Helium process gas. However, once oxidised, it may be imperative to remove all oxygen from the web before a second coating step may take place because of the interaction oxygen with the coating material to be used. This may be easily accomplished in accordance with the present invention by incorporating one or more intermediate chambers through which the web must pass prior to application of the coating in order to ensure the substantially if not total removal of oxygen from the web. This can be achieved using either one process chamber or a series of process chambers interspersed with intermediate chambers being adapted to function as required in accordance with the present invention. Further coatings or treatments of the web may be undertaken as required to obtain the required overall coating on the web.

In a still further embodiment where a substrate is to be coated, rather than having a multiple series of plasma assemblies, a process chamber containing a single plasma region may be utilised with a means for varying the coating materials being introduced into the process chamber and typically passing through the plasma zone formed between the electrodes. For example, initially the only substance passing through the plasma zone might be process gas such as helium which is excited by the application of the potential between the electrodes to form a plasma zone. The resulting helium plasma may be utilised to clean and/or activate the substrate which is passed through or relative to the plasma zone. Then one or more coating forming precursor material(s) and the active material may be introduced and the one or more coating forming precursor material(s) are excited by passing through the plasma zone and treat the substrate. The substrate may be moved through the plasma zone on a plurality of occasions to effect a multiple layering and where appropriate the composition of the coating forming precursor material(s) may be varied by replacing, adding or stopping the introduction of one or more for example introducing one or more coating forming precursor material(s) and/or active materials.

Any suitable non-thermal equilibrium plasma equipment may be used to undertake the method of the present invention, however means for generating a diffuse dielectric barrier discharge such as atmospheric pressure glow discharge, dielectric barrier discharge (DBD) and low pressure glow discharge, which may be operated in either continuous mode or pulse mode are preferred.

The plasma equipment may also be in the form of a plasma jet, for example, as described in WO 03/085693, in which a substrate is placed downstream and remote from the plasma source.

Any conventional means for generating an atmospheric diffuse dielectric barrier discharge whereby the breakdown of the process gas occurs uniformly across the plasma gap resulting in a homogeneous plasma across the width and length of a plasma chamber may be used. Examples include atmospheric pressure plasma jet, atmospheric pressure microwave glow discharge and atmospheric pressure glow discharge. Typically, such means will employ helium as the process gas and a high frequency (e.g. >1 kHz) power supply to generate a homogeneous diffuse dielectric barrier discharge (e.g. homogenous glow discharge) at atmospheric pressure or thereabouts via the Penning ionisation mechanism discussed previously. Corona processes as hereinbefore described are excluded from the above as they do not provide uniform breakdown of the process gas occurs uniformly across the plasma gap and as such produce a non-homogeneous discharge.

In the case of low pressure plasma such as low pressure glow discharge plasma, liquid precursor and the active material is preferably either retained in a container or is introduced into the reactor in the form of an atomised liquid spray as described above. The low pressure plasma may be performed with liquid or gas precursor and/or active material heating and/or pulsing of the plasma discharge, but is preferably carried out without the need for additional heating. If heating is required, the method in accordance with the present invention using low pressure plasma techniques may be cyclic, i.e. the liquid precursor is plasma treated with no heating, followed by heating with no plasma treatment, etc., or may be simultaneous, i.e. liquid precursor heating and plasma treatment occurring together. The plasma may be generated by way of the electromagnetic radiations from any suitable source, such as radio frequency, microwave or direct current (DC). A radio frequency (RF) range between 8 and 16 MHz is suitable with an RF of 13.56 MHz preferred. In the case of low pressure diffuse dielectric barrier discharge or glow discharge, any suitable reaction chamber may be utilized. The power of the electrode system may be between 1 and 100 W, but preferably is in the region of from 5 to 50 W for continuous low pressure plasma techniques. The chamber pressure may be reduced to any suitable pressure for example from 0.1 to 0.001 mbar (10 to 0.1 Pa) but preferably is between 0.05 and 0.01 mbar (5 and 1 Pa).

A particularly preferred pulsed plasma treatment process involves pulsing the plasma discharge at room temperature. The plasma discharge is pulsed to have a particular "on" time and "off" time, such that a very low average power is applied, for example a power of less than 10 W and preferably less than 1 W. The on-time is typically from 10 to 10000 μs, preferably 10 to 1000 μs, and the off-time typically from 1000 to 10000 μs, preferably from 1000 to 5000 μs. Atomised liquid precursors and the active material(s) may be introduced into the vacuum with no additional gases, i.e. by direct injection, however additional process gases such as helium or argon may also be utilized as carriers where deemed necessary.

In the case of the low pressure plasma options the process gas for forming the plasma may be as described for the atmospheric pressure system but may alternatively not comprise noble gases such as helium and/or argon and may therefore purely be oxygen, air or an alternative oxidising gas.

The process region may contain one or more pairs of electrodes between which plasmas are generated by excitation of the process or required gas passing through the chamber. The process chamber may be designed so that the web passes through a plasma generated between a first pair of parallel electrodes (preferably vertically aligned) and then through a plasma generated between a second pair of parallel electrodes (preferably again vertically aligned). Any suitable means of transporting the web may be utilised although preferably the means of transporting the substrate is by a reel-to-reel based process. The substrate may be transported through the first plasma process region in an upwardly or downwardly direction. Preferably when the substrate passes through one plasma zone in an upwardly direction and the other in a downwardly direction one or more guide rollers are provided to guide the substrate through both plasma regions in the process chamber. The substrate residence time in each plasma region may be predetermined prior to coating and rather than varying the speed of the substrate, through each plasma zone, the path length a substrate has to travel through each plasma region may be altered such that the substrate may pass through both regions at the same speed but may spend a different period of time in each plasma region due to differing path lengths through the respective plasma regions.

In view of the fact that the electrodes in the present invention are vertically orientated it is preferred that a substrate be transported through an atmospheric pressure plasma assembly in accordance with the present invention upwardly through one plasma region and downwardly though the other plasma region. On the basis of the distance between adjacent electrodes, as will be discussed below, it will be appreciated that the substrate is generally transported through a plasma region in a vertical or diagonal direction although in most cases it will be vertical or substantially vertical.

Preferably each substrate needs only to be subjected to one pass through the assembly but if required the substrate may be returned to the first reel for further passages through the assembly.

Additional pairs of electrodes at least one of which is coated in a dielectric material may be added to the system to form further successive plasma regions through which, in use, a substrate would pass. The additional pairs of electrodes may be situated before or after said first and second pair of electrodes such that substrate would be subjected to pre-treatment or post-treatment steps. Said additional pairs of electrodes are preferably situated before or after and most preferably after said first and second pairs of electrodes. Treatments applied in the plasma regions formed by the additional pairs of electrodes may be the same or different from that undertaken in the first and second plasma regions. In the case when additional plasma regions are provided for pre-treatment or post-treatment, the necessary number of guides and/or rollers will be provided in order to ensure the passage of the substrate through the assembly. Similarly preferably the substrate will be transported alternatively upwardly and downwardly through all neighbouring plasma regions in the assembly.

The present invention may be used to form many different types of substrate coatings. The type of coating which is formed on the substrate is determined by the coating-forming material(s) used, and the present method may be used to (co)polymerise coating-forming monomer material(s) onto the substrate surface. The coating-forming material may be organic or inorganic, solid, liquid or gaseous, or mixtures thereof. Trapped active materials may be applied on to substrate surfaces by means of the present equipment and processes. The term Active material(s) as used herein is intended to mean one or more materials that perform one or more specific functions when present in a certain environment and in the case of the present application they are chemical species which do not undergo chemical bond forming reactions within a plasma environment. It is to be appreciated that an active material is clearly discriminated from the term "Reactive". A reactive material or chemical species is intended to mean a species which undergoes chemical bond forming reactions within a plasma environment. The active may of course be capable of undergoing a reaction after the coating process.

The substrate may be in the form of webs comprising synthetic and/or, natural fibres, woven or non-woven fibres fabrics, woven or non-woven fibres, natural fibres, synthetic fibres cellulosic material, aggregated textile fibres, yarn, and the like. However, the size of the substrate is limited by the dimensions of the volume within which the atmospheric pressure plasma discharge is generated, i.e. the distance between the electrodes of the means for generating the plasma.

The substrate to be coated may comprise plastics for example thermoplastics such as polyolefins e.g. polyethylene, and polypropylene, polycarbonates, polyurethanes, polyvinylchloride, polyesters (for example polyalkylene terephthalates, particularly polyethylene terephthalate), polymethacrylates (for example polymethylmethacrylate and polymers of hydroxyethylmethacrylate), polyepoxides, polysulphones, polyphenylenes, polyetherketones, polyimides, polyamides, polyaramids, polystyrenes, phenolic, epoxy and melamine-formaldehyde resins, and blends and copolymers thereof. Preferred organic polymeric materials are polyolefins, in particular polyethylene and polypropylene. Other substrates include metallic thin films made from e.g. aluminium, steel, stainless steel and copper or the like.

Substrates coated using the apparatus of the present invention may have various uses. For example, a silica-based coating, generated in an oxidising atmosphere, may enhance the barrier and/or diffusion properties of the substrate, and may enhance the ability of additional materials to adhere to the substrate surface. A halo-functional organic or siloxane coating (e.g. perfluoroalkenes) may increase hydrophobicity, oleophobicity, and fuel and soil resistance; enhance gas and liquid filtration properties and/or the release properties of the substrate. A polydimethylsiloxane coating may enhance water resistance and release properties of the substrate, and may enhance the softness of fabrics to touch; a polyacrylic acid polymeric coating may be used as a water wettable coating, bio-compatible coating or an adhesive layer to promote adhesion to substrate surface or as part of laminated structure. The inclusion of colloidal metal species in the coatings may provide surface conductivity to the substrate, or enhance its optical properties. Polythiophene and polypyrrole give electrically conductive polymeric coatings which may also provide corrosion resistance on metallic substrates. Acidic or basic functionality coatings will provide surfaces with controlled pH, and controlled interaction with biologically important molecules such as amino acids and proteins.

Each of the developments described herein lead to improved web velocities through the process chamber which in the case of atmospheric pressure plasma treatment processes will allow the Continuous Atmospheric Plasma Treatment Processes (CAPTP) to operate at higher speeds on porous and non-porous webs than is currently possible. The design will allow processing of porous webs that are currently restricted to vacuum plasma chambers to be carried out in an atmospheric environment. The processes could be carried out in a continuous manner rather than the current batch method.

The design will allow for the CAPTP design to become a substantially flat system. Adequate sealing will allow many types of system geometry that previously could not have been considered.

The invention will be more clearly understood from the following description of some embodiments thereof given by way of example only with reference to the accompanying drawings, in which:—

FIGS. 1a and 1b are intended to exemplify the situations observed in prior art process chambers with particular reference to the size of the chamber;

FIG. 2. depicts a process chamber having two re-circulation channels;

FIG. 3 depicts a process chamber as in FIG. 2 with an intermediate chamber upstream of the process chamber;

FIG. 4. depicts a process chamber as in FIG. 2 with a series of counter-current intermediate chambers for the removal of external fluids from a porous web;

Figure 1A:
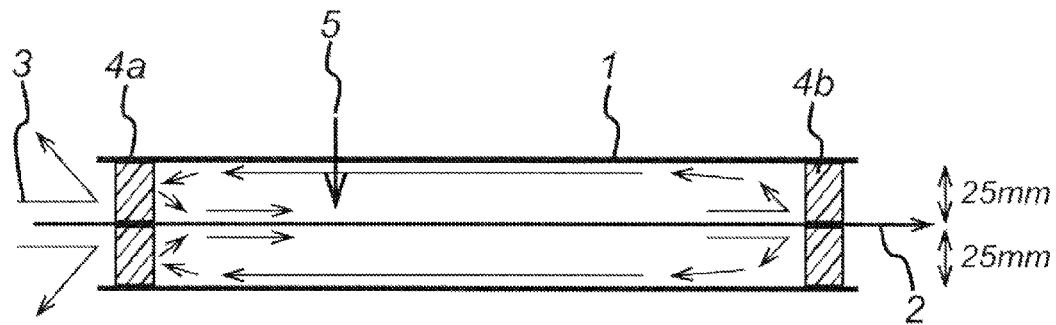
Figure 1B:
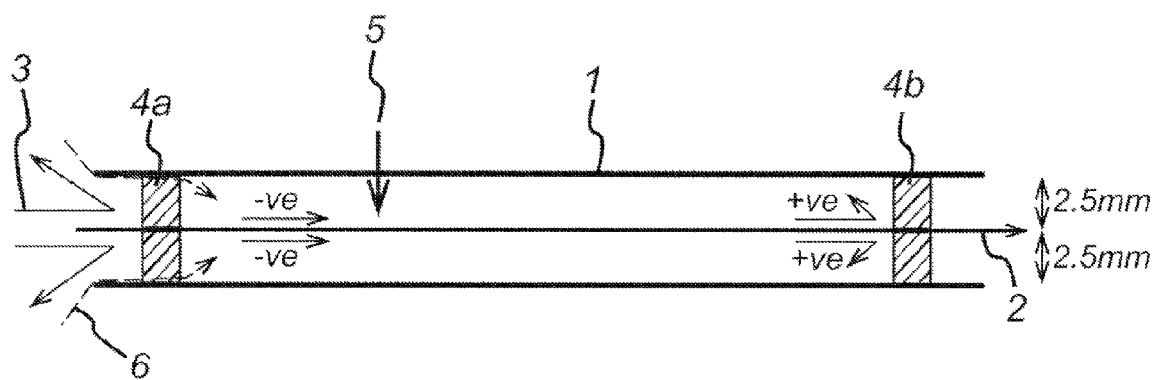

In FIG. 1a there is provided a process chamber 1 through which a web material 2 passes. Chamber 1 is sealed by seals 4a at the inlet and seals 4b at the outlet thereof. Seal 4a defines the inlet and seal 4b defines the outlet of process chamber 1. Required gas may be introduced into the system as and when needed to maintain the predetermined atmosphere within the process chamber. FIG. 1a is intended to show a system having a chamber 1 with walls parallel to the moving web but sufficiently remote therefrom (e.g. 25 mm) to enable required gas to re-circulate along the walls of the chamber from the outlet to the inlet thereby equalising/negating any pressure difference which otherwise develop, thus preventing pressure differentials between the outlet and inlet and substantially preventing the ingress of external gases into the system caused by such a pressure differential. Seal 4a substantially prevents the external gas e.g. air 3 from being dragged into chamber 1. These numerals will be used in all subsequent Figures to represent the same features The same situation does not occur in FIG. 1b. In FIG. 1b it will be appreciated that the chamber width is significantly smaller. In this case because there is not sufficient free space between the web and the outer walls of the chamber the re-circulation of the required gas is substantially prevented due to the dimensions of the chamber and the effects of drag caused by the web passing therethrough. In this case, areas of differing pressure are created at the inlet and outlet of process chamber 1. This pressure differential leads to and causes increasing amounts of pollutants 6 to be dragged into the system through inlet seal 4a so reducing its efficiency. Similarly with outlet seal 4b the increase in pressure relative to the external environment will cause gasses in the process chamber to be blown out through outlet seal 4b.

Figure 2:
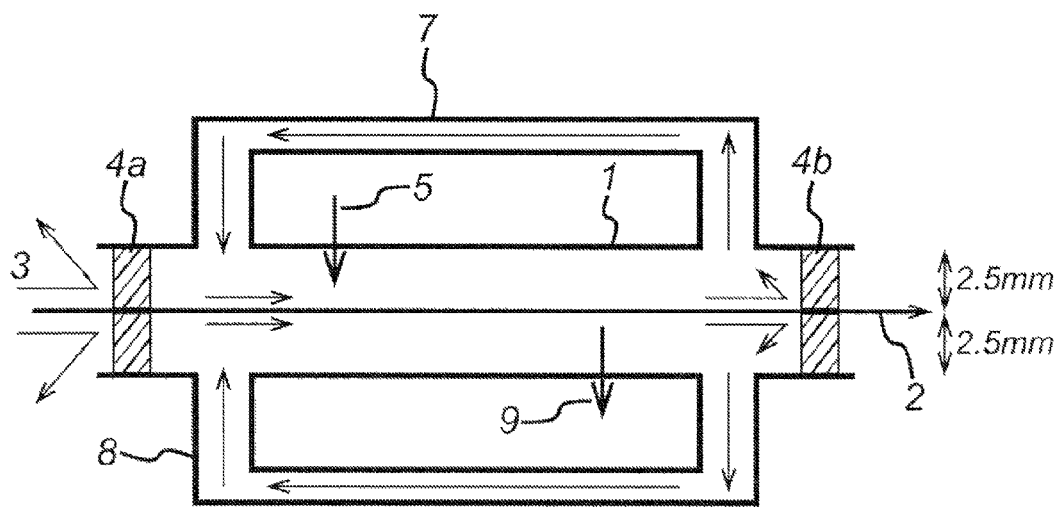

FIG. 2 provides a first embodiment of the present invention as in this case two re-circulation channels 7, 8 are provided. These channels 7, 8 enable the required gas in the system to be re-circulated within process chamber 1 from the outlet region in the proximity of seal 4b to the inlet region in the proximity of seal 4a. Such a re-circulation system prevents the formation of differential pressures between the inlet and out let regions and protects the integrity of inlet seal 4a, thus preventing/minimizing the ingress of external gases. A required process gas inlet 5 and outlet 9 are also provided to enable the continuous or periodic purging of process chamber 1 to remove external gases drawn into chamber 1 as a boundary layer around the web of material 2.

Figure 3:
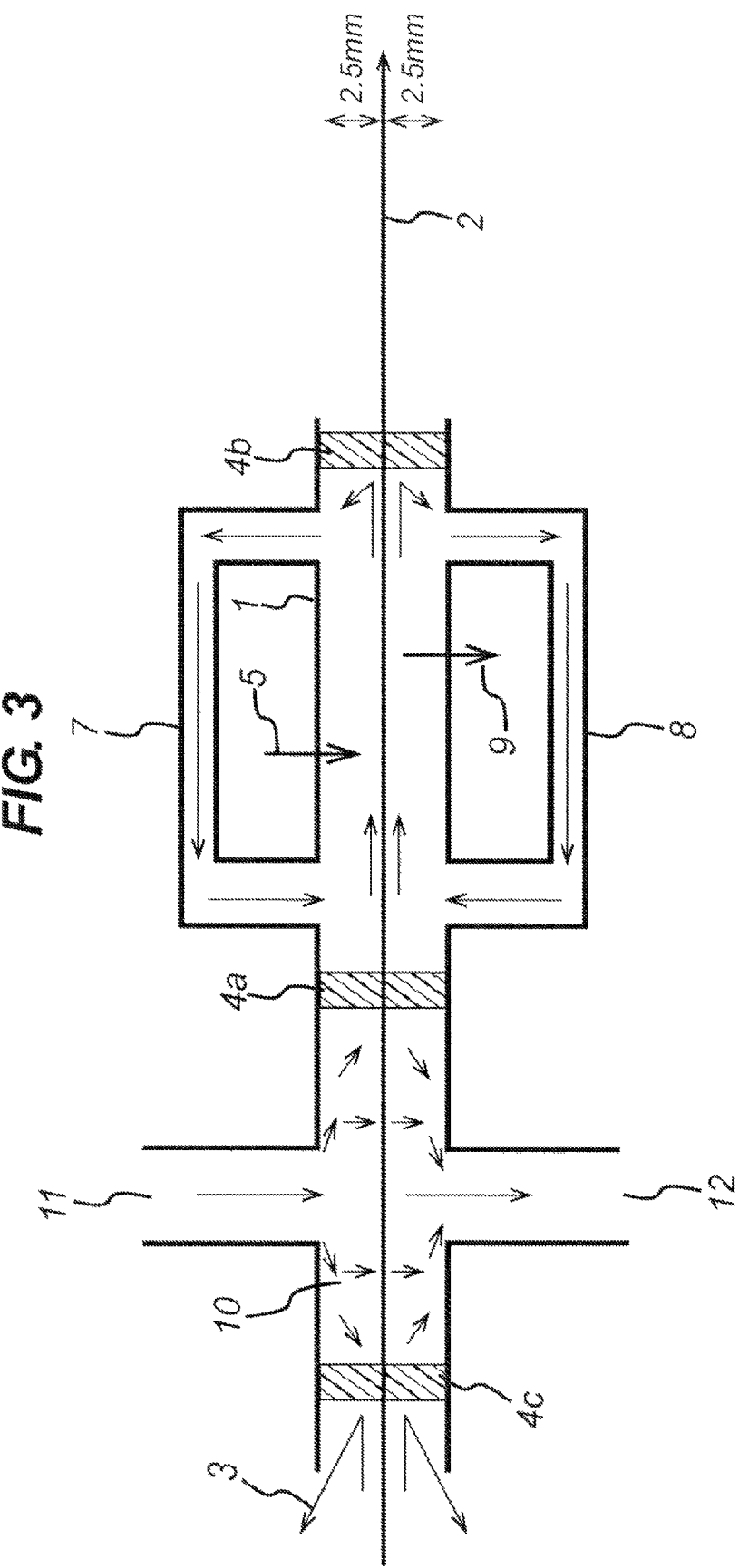

FIG. 3. Shows the first embodiment of the present invention as described in FIG. 2 in use for treating a porous web 2 in combination with a means for removal of fluids trapped in the porous web 2 prior to entry into process chamber 1. In FIG. 3 an intermediate chamber 10 is provided upstream of process chamber 1. Seal 4a acts as the inlet seal for process chamber 1 and as the outlet seal for intermediate chamber 10. The inlet seal for intermediate chamber 10 is depicted as 4c. In FIG. 3 the gas mixture to be used in the process chamber is introduced at 11 into the intermediate chamber 10. Intermediate chamber 10 is designed to enable required gas flow from entry 11 through the porous web 2 as it travels through intermediate chamber 10 and out through outlet 12 in combination with the removed fluids. Preferably the removed gas/fluids mixture is then returned for recycling and in the case of the required gas re-use in the system. Hence the web matrix is substantially free of external fluids before entering process chamber 1 and the boundary layer about the web is also substantially composed of required gas and not an unwanted external gas such as air.

Figure 4:
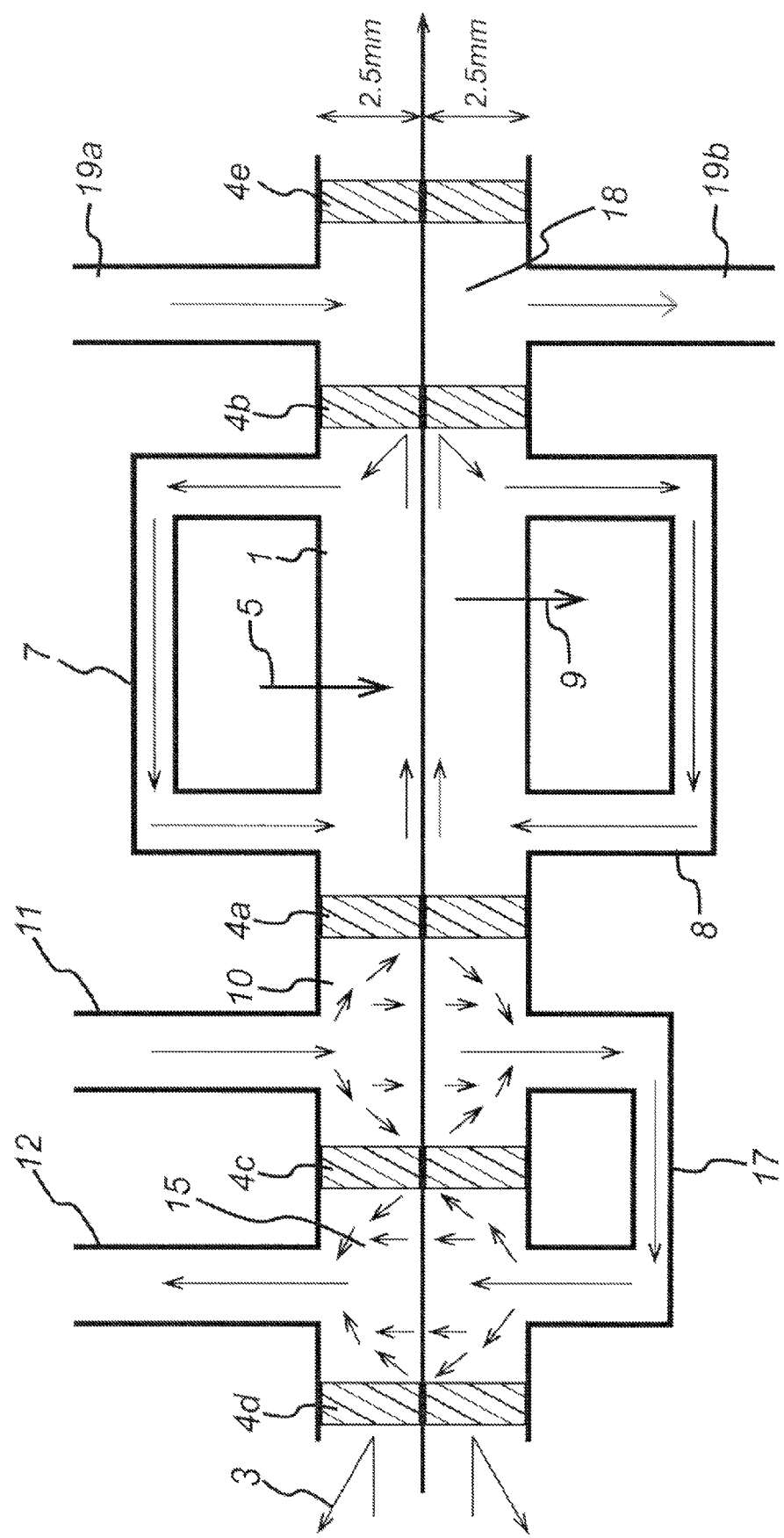

In FIG. 4 there is depicted an expanded version of the system of FIG. 3 in which there is provided a series of two counter-current intermediate chambers 10 and 15 upstream of the process chamber. In this case seal 4c depicts the inlet seal of chamber 10 and the outlet seal of chamber 15 and seal 4d depicts the inlet seal of chamber 15. Required gas is initially supplied into intermediate chamber 10 via inlet 11 and then passes into and through web 2 and out via channel 17 to intermediate chamber 15 again through the web 2 and then the resulting required gas and previously trapped fluids/boundary layer mixture is removed through exit 12 for recycling.

An additional chamber 18 has also been provided for removal of required gas from web 2 subsequent to treatment in process chamber 1. An external gas mixture (or a gas mixture required for the next process chamber (not shown) is directed to and through the web 2 from inlet 19a to remove all the required gas from process chamber 1. The resulting gaseous mixture is removed via exit 19b for recycling. Chamber 18 has an inlet seal 4b which also acts as the outlet seal of process chamber 1 and an outlet seal 4e.

Figure 5:
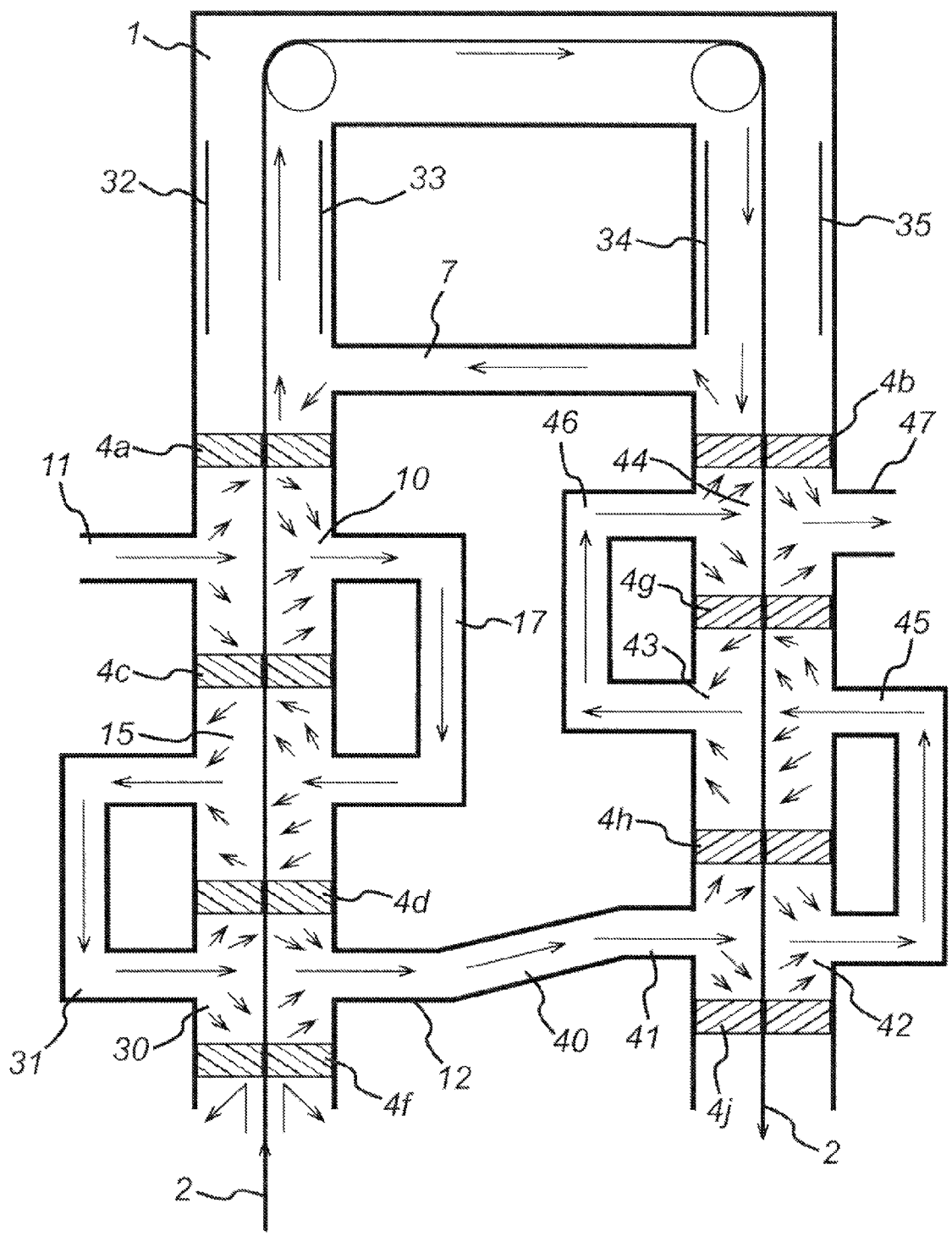
FIG. 5 depicts a continuous atmospheric pressure plasma system comprising a re-circulation channel and a series of counter-current intermediate chambers for the removal of external fluids from a porous web.

FIG. 5 depicts an atmospheric plasma system in accordance with the present invention having a series of intermediate chambers and post-process chambers for removal of unwanted gas from a web of porous substrate material. It is to be appreciated that either embodiment may be used independently of the other but preferably both embodiments will be utilized to maximize the efficiency of the system. FIG. 5 depicts a process chamber 1 through which a web of material 2 is being passed. Process chamber 1 comprises two plasma zones a first between parallel electrodes 32 and 33 and a second between parallel electrodes 34 and 35. A re-circulation channel 7 is provided to link the inlet and outlet of process chamber 1 and to negate any pressure differences therebetween.

FIG. 5 also depicts a three intermediate chamber 10, 15 and 30 counter-current system for replacing fluids trapped in the web matrix with a required gas. In a plasma process of the present type typically the required gas utilized in both the process chamber and in the counter-current system passing through intermediate chambers 10, 15 and 30 from entrance 11 to exit 12 via channels 17 and 31 is any suitable gas discussed above, but typically comprises helium. In this case seal 4c depicts the inlet seal of chamber 10 and the outlet seal of chamber 15 and 4d depicts the inlet seal of chamber 15 and the outlet seal of chamber 30 and 4f depicts the inlet seal of chamber 30. Additionally in this example there is also provided a three post-process chamber 42, 43, 44 counter-current system for replacing required gas (typically helium) entering into intermediate chamber 44 subsequent to web treatment in process chamber 1 with external gas (typically air). The required gas may form part of the general atmosphere within chamber 44, and/or comprise the boundary layer around web 2 and/or be trapped within the web matrix. In this case seal 4g depicts in the outlet seal of chamber 44 and the inlet seal of chamber 43, seal 4h depicts the outlet seal of chamber 43 and the inlet seal of chamber 42 and 4j depicts the outlet seal of chamber 42. Intermediate chamber 42 is connected to chamber 43 via channel 45 and chamber 43 is connected to chamber 44 via channel 46. Gases enter chamber 42 by way of inlet 41 and leave chamber 44 via exit 47 for recovery of the required gas.

In use, web 2 enters chamber 30 from an external supply means (not shown) through seal 4f and then progresses sequentially through chambers 15 and 10 before entering process chamber 1 through inlet seal 4a. As web 2 passes through the intermediate chambers 30, 15, 10, it encounters an increasingly concentrated amount of required gas (helium) passing through intermediate chambers 10, 15 and 30 in the opposite direction. This three intermediate chamber 10, 15, 30 process is designed to remove any external gas remaining in the boundary layer around web 2 such that the boundary layer entering process chamber 1 should substantially consist of required gas. The three intermediate chamber 10, 15, 30 process also ensures that the vast majority if not all trapped fluids within web 2 upon entering intermediate chamber 30 has been replaced with required gas by the time web 2 enters process chamber 1. The mixture of required gas and pollutants (external gasses and trapped fluids) which leaves chamber 30 via exit 12 is either subsequently transported to a reprocessing system for separating process gas from external gas before reuse or alternatively may be transferred directly from exit 12 along a channel 40 to entrance 41 of a counter current process designed to remove required gas from the web subsequent to passage through process chamber 1. Upon entering process chamber 1 web 2 passes sequentially through two plasma zones between electrodes 32 and 33 and electrodes 34 and 35 for the appropriate treatments and then is drawn out of process chamber 1 through outlet seal 4b. Re-circulation channel 7 is provided to minimize the pressure difference between the inlet and outlet of process chamber 1. In the case of FIG. 5, web 2 passes through the intermediate chambers 44, 43 and 42 sequentially, encountering an increasingly concentrated amount of external gas (air) passing through intermediate chambers 42, 43 and 44 sequentially to remove as much required gas as possible prior to web 2 exiting chamber 42 via seal 4j.

Figure 6:
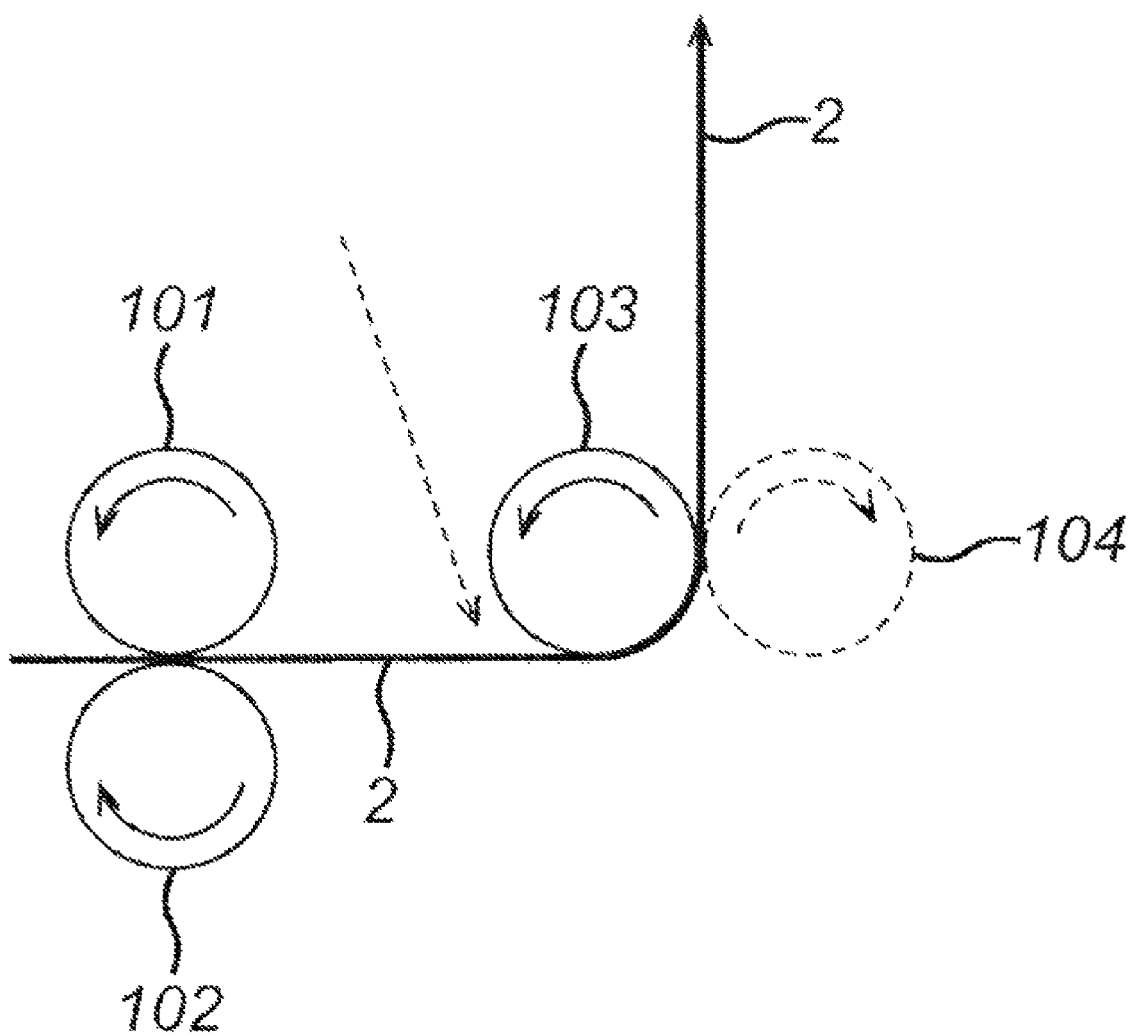
FIG. 6 depicts a means of stretching the pores in the web whilst travelling through a pre-process or post-process chamber

FIG. 6 depicts an enhancement to the present invention to enhance the removal of unwanted gas from the pores in the web. In FIG. 6, web 2 is initially transported between pinch rollers 101 and 102 whilst maintaining a horizontal pathway for web prior to and subsequent to passage through the rollers. Web 2 is then transported to roller 103 over which the web is guided such that the pathway of web 2 changes direction by approximately 90° subsequent to moving over roller 103 (i.e. upon leaving roller 103 the direction of motion of web 2 is approximately perpendicular to the direction of approach of the web 2 to roller 103. The engagement of web 2 with roller 103 causes an initial stretching or pore opening effect on the "pores" within web 2 forcing trapped external gas out from the pores in web 103. Furthermore by introducing required gas (typically helium in the plasma example used herein) into the gap between roller 103 and web 2 immediately prior to the initial web/roller (103) interconnection, the replacement of unwanted gas by required gas is enhanced. The inventors have found that whilst only a single roller 103 is necessary for such an effect to occur, the effect may be further enhanced by the provision of a second roller 104 adapted to "pinch" web 2 when used in conjunction with roller 103 after the web has moved through 90°. The pinch effect resulting from transporting web 2 between the two rollers 103, 104 prevents or at least significantly reduces the likelihood of unwanted gas being transported with web 2 past the rollers 103 and 104 in the system due to the drag effect caused by the swift movement of web 2 through the system.

Figure 7:
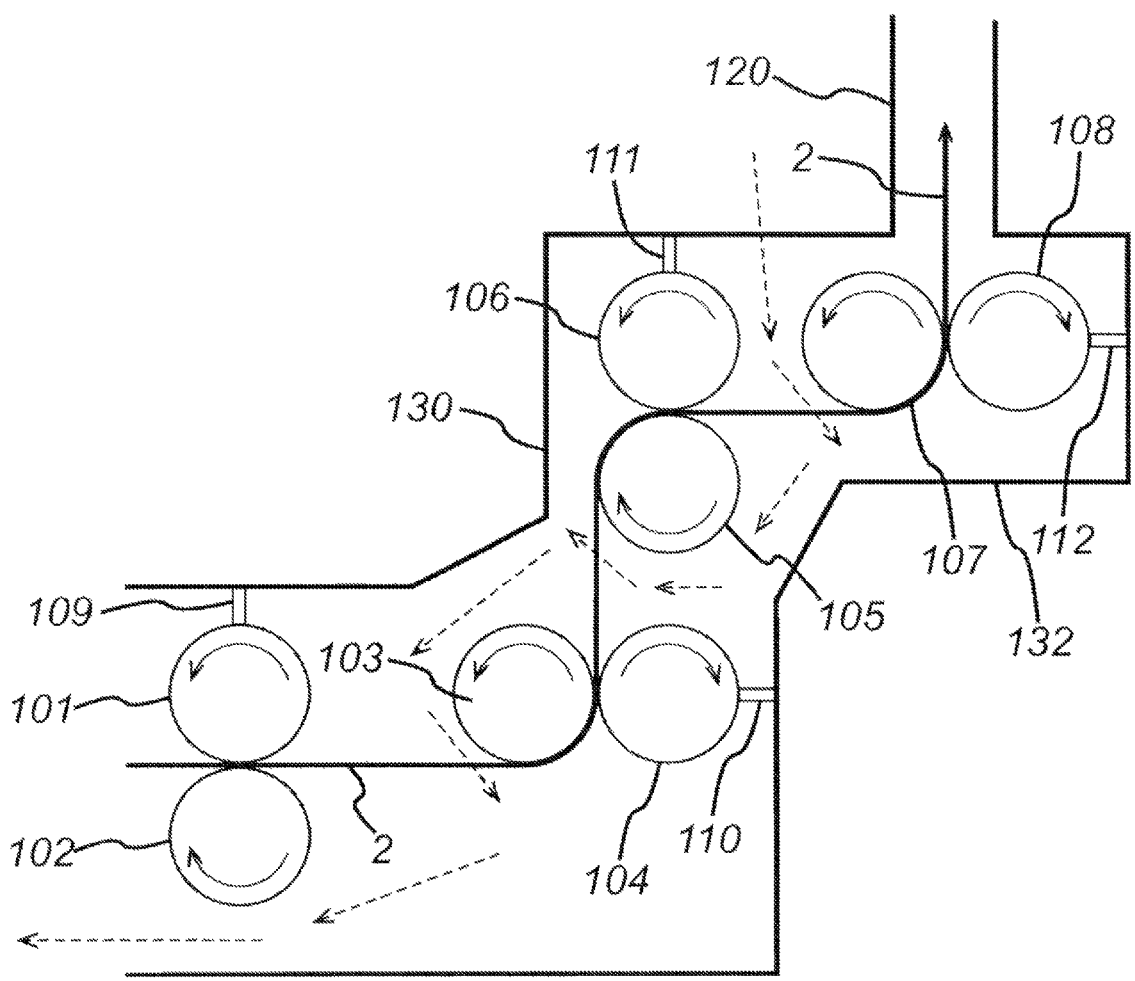
FIG. 7 depicts an alternative embodiment series of counter-current pre-process chambers for the removal of external fluids from a porous web.

FIG. 7 provides an example of a still further embodiment of the present invention in which the replacement of unwanted gas is entirely or at least substantially carried out solely using a series of pairs of rollers of the type described in FIG. 6. FIG. 7 depicts two pre-process chambers through which web 2 is transported prior to entry into the process chamber 120. In this embodiment web 2 is utilised as a moving wall for both pre-process chambers. The first pre-process chamber through which the web is transported comprises roller 101, web 2, roller 103, roller 106 roller face seal 111 wall, 130 and roller face seal 109. The second pre-process chamber is formed between roller 104, roller face seal 110 outer wall 132, roller face seal 112, roller 108 web 2, and roller 105. The web is transported along the following pathway, between rollers 101 and 102, around roller 103 (through approximately 90°) and between said roller 103 and roller 104, around roller 105 (through approximately 90°), and between rollers 105 and 106, around roller 107 (through approximately 90°) between roller 107 and roller 108 and into process chamber 120. Required gas is introduced into the gap formed between roller 107 and web 2 immediately prior to interengagement therebetween. The required gas is directed through web 2 into the second pre-process chamber. Required gas is directed through web 2, preferably directed into the gap between web 2 and roller 105 into the first pre-process chamber and through first pre-process chamber, preferably directed into the gap between web 2 and roller 103 immediately prior to interengagement therebetween. The gas mixture exiting first pre-process chamber through web 2 is then directed to an appropriate exit means, optionally for recycling.

Figure 8:
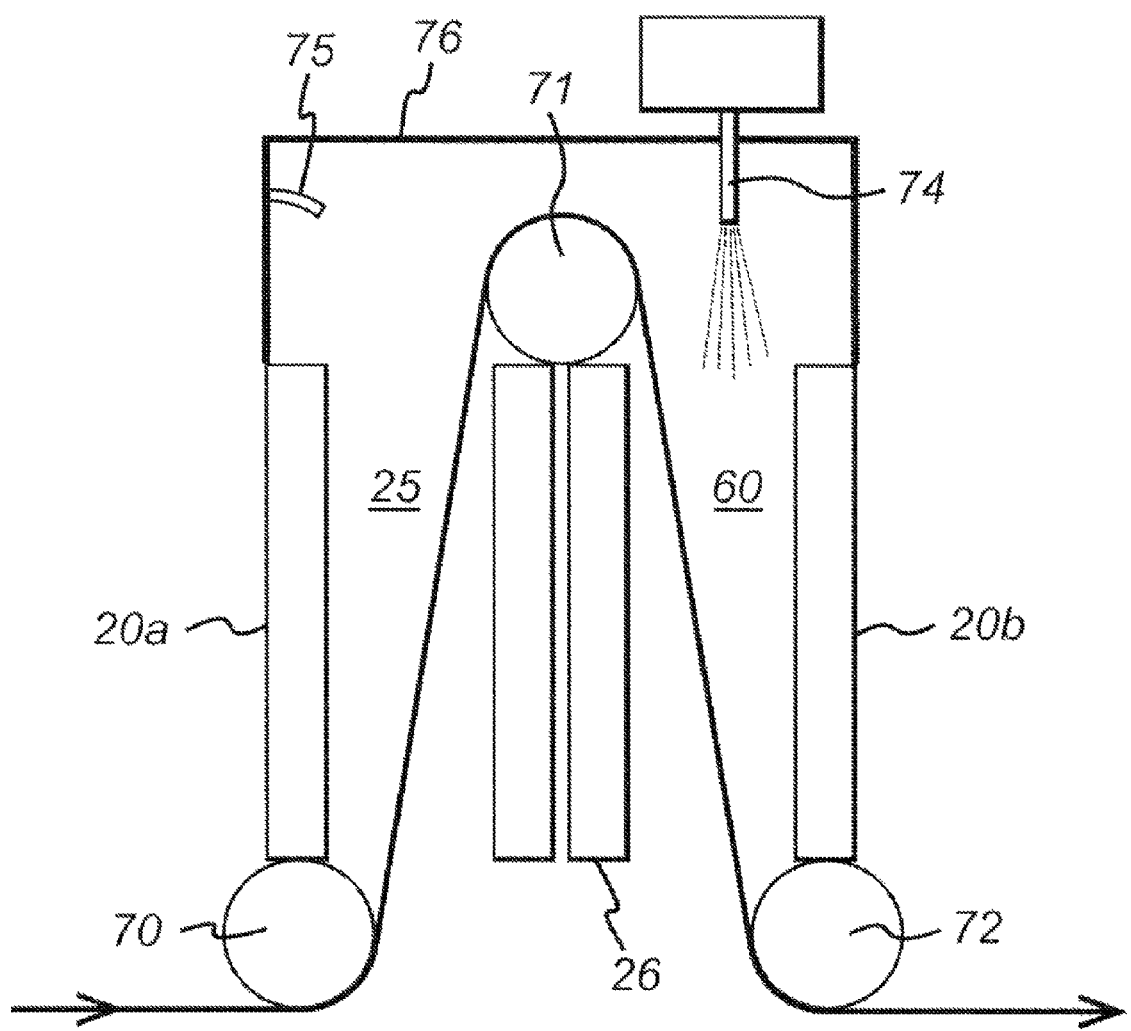
FIG. 8 depicts a plasma system which may form part of the apparatus present invention.

A more detailed explanation of the plasma process which may be carried out is described with the aid of FIG. 8 in which there is provided a figure showing how a flexible substrate is treated in accordance with the present invention. A means of transporting a substrate through the process chamber is provided in the form of guide rollers 70, 71 and 72, a required gas inlet 75, an assembly lid 76 and a coating material inlet introducing means 74. Preferably, the coating material introducing means 74 is a means of supplying liquid droplets or droplets derived from a liquid/solid slurry into the process chamber such as an ultrasonic nozzle 74 for introducing an atomised liquid into plasma region 60 are provided. The required gas inlet 75 in this case is the inlet for the gas needed to generate a plasma between the pairs of electrodes and is depicted in the assembly lid 76.

In use, a flexible substrate is transported to and over guide roller 70 and is thereby guided through plasma region 25 between electrodes 20a and 26. The plasma generated in plasma region 25 is a cleaning helium plasma, i.e. no reactive agent is directed into plasma region 25. The helium is introduced into the system by way of inlet 75. Lid 76 is placed over the top of the system to prevent the escape of helium, as it is lighter than air. Upon leaving plasma region 25 the plasma cleaned substrate passes over guide 71 and is directed down through plasma region 60, between electrodes 26 and 20b and over roller 72 and then may pass to further units of the same type for further treatment. However, plasma region 60 generates a coating for the substrate by means of the injection of a liquid or sold coating making material through ultrasonic nozzle 74. An important aspect of the fact that the reactive agent being coated is a liquid or solid is that said atomised liquid or solid travels under gravity through plasma region 60 and is kept separate from plasma region 25 and as such no coating occurs in plasma region 25. The coated substrate then passes through plasma region 60 and is coated and then is transported over roller 72 and is collected or further treated with additional plasma treatments. Rollers 70 and 72 may be reels as opposed to rollers. Having passed through is adapted to guide the substrate into plasma region 25 and on to roller 71.

EXAMPLE

An example in support of the present invention is provided below to show the significant improvement in quality of the plasmas produced when using recirculation channels in accordance with the present invention in a plasma zone through which a web of material passes at varying speeds.

In the present example the electrodes utilised were two parallel non-metallic electrodes comprising a salt solution as described in WO 2004/068916. The electrodes were 1.2m square and were sufficiently transparent to enable the plume generated as a result of the plasma formed between the electrodes to be visualised. The plates were a fixed distance of 6 mm apart. The seals were rubber lip seals installed such that the leading edge of the lips overlapped by 1 mm such that a light pressure was applied to the web when said web moved between the seals. The potential between the electrodes utilised to generate plasma therebetween was 4 kV. Helium was supplied to the system at a constant rate of 10 standard liters per minute (slpm). The web transported through plasma was a 300 mm wide film of polypropylene having a thickness of 0.15 mm.

The quality of the plasma generated using the above criteria was determined by the visible area of the electrodes between which a plume was visible. It will be seen from Table 1 below that the significantly best plasma generated as the web speed was increased was in accordance with the present invention whereby there was provided lip seals at the beginning and end of the plasma chamber and which were provided with recirculation channels which were used to stabilise the internal pressures within the plasma chamber.

TABLE 1

| Condition | | Web Speed (m/min) | Plasma % |
|---|---|---|---|
| 1 | 2 Seals + Recirculation | 0 | 100 |
| | | 5 | 95 |
| | | 10 | 95 |
| | | 20 | 95 |
| | | 40 | 90 |
| | | 60 | 70 |
| | | 67 | 50 |
| 2 | 2 Seals – No Recirculation | 0 | 100 |
| | | 5 | 100 |
| | | 10 | 40 |
| | | 20 | 20 |
| | | 40 | 20 |
| | | 60 | 0 |
| 3 | Outlet Seal | 0 | 100 |
| | | 2 | 100 |
| | | 5 | 10 |
| | | 10 | 0 |
| 5 | Inlet Seal | 0 | 100 |
| | | 2 | 100 |

TABLE 1-continued

| Condition | | Web Speed (m/min) | Plasma % |
|---|---|---|---|
| | | 5 | 50 |
| | | 10 | 0 |
| 4 | No Seals | 0 | 100 |
| | | 2 | 100 |
| | | 5 | 0 |
| | | 10 | 0 |

The invention claimed is:

1. An apparatus for treating a travelling web of material in a predetermined gaseous atmosphere comprising a process chamber through which a moving web of material is transported from an inlet at a first end of said process chamber to an outlet at a second end of said process chamber and an introducer and controller for introducing and controlling gas intended to provide the predetermined gaseous atmosphere within said process chamber, wherein said inlet and outlet each comprise a sealing means designed to enable passage of the web of material therethrough whilst minimising the ingress of an external gas boundary layer around the web of material characterised in that said apparatus also comprises one or more re-circulation channels adapted to re-circulate gases within said process chamber from said second end of said process chamber to said first end of said process chamber thereby substantially negating any pressure difference within said process chamber between said inlet and outlet, wherein said apparatus further comprises at least one intermediate chamber upstream and/or downstream of said process chamber, said at least one intermediate chamber comprising a purging system for purging the travelling web of material with required gas prior to entry into or subsequent to exit from said process chamber so as to replace fluid trapped in the web of material with a required gas, and a gas remover for extracting purged fluids from said at least one intermediate chamber, and wherein adjacent intermediate chambers of said at least one intermediate chamber are linked by one or more channels adapted to supply required gas, which was not previously recirculated, into said intermediate chamber neighbouring said process chamber and then sequentially through the other intermediate chamber in series as they progress away from said process chamber so as to provide a counter-current of required gas moving through said intermediate chambers in the opposite direction to the direction of passage of the web of material.

2. An apparatus in accordance with claim 1 characterised in that all functioning re-circulation channels are situated on one side of the web of material.

3. An apparatus in accordance with claim 1 characterised in that at least one functioning re-circulation channel is situated on either side of the web of material.

4. An apparatus in accordance with claim 1 where said at least one intermediate chamber is further defined as a plurality of intermediate chambers upstream and/or downstream of said process chamber.

5. An apparatus in accordance with claim 1 characterised in that the supply of required gas and removal of required gas/extracted fluid through each intermediate chamber is independent of other intermediate chambers.

6. An apparatus in accordance with claim 1 characterised in that said introducer and controller in said process chamber is independent of said purging system and said gas remover in said intermediate chambers.

7. An apparatus in accordance with claim 1 characterised in that said at least one intermediate chambers comprises at least one intermediate chamber located upstream of said process chamber, wherein said at one least upstream intermediate chamber comprises said gas remover.

8. An apparatus in accordance with claim 1 characterised in that said sealing means are selected from nip seals, lip seals and/or pinch rollers or any suitable combination thereof.

9. An apparatus in accordance with claim 1 characterised in that said process chamber comprises at least one non thermal equilibrium plasma generating means or at least one corona discharge assembly.

10. An apparatus in accordance with claim 9 characterised in that the non thermal equilibrium plasma generating means comprises a means for generating a diffuse dielectric barrier discharge.

11. An apparatus in accordance with claim 1 characterized in that the pressure of gas within said process chamber is atmospheric pressure.

12. A process for treating a travelling web of material in a predetermined gaseous atmosphere, the process comprising transporting the travelling web of material through a process chamber having a predetermined gaseous atmosphere and one or more re-circulation channels, from an inlet at a first end of the process chamber to an outlet at a second end of the process chamber, wherein the inlet and outlet each comprise a sealing means to allow passage of the web of material therethrough whilst minimising the ingress of an external gas boundary layer around the web of material, and wherein the one or more re-circulation channels re-circulate the gases within the process chamber from the second end of the process chamber to the first end of the process chamber such that any pressure differential between the inlet and outlet is substantially negated, characterised in that the travelling web of material which is to be or has been treated in the process chamber using a predetermined gaseous atmosphere is pre and/or post-treated by the steps of transporting the web of material through the one or more intermediate chambers prior to or subsequent to processing in the process chamber, wherein whilst the web of material is resident within each intermediate chamber, the intermediate chamber is purged with a suitable gas to replace fluid trapped in the web of material with a required gas, the intermediate chamber comprising a purging system for purging the travelling web of material with required gas prior to entry into or subsequent to exit from the process chamber so as to replace fluid trapped in the web of material with a required gas, and a gas remover for extracting purged fluids from the intermediate chamber, and wherein adjacent intermediate chambers are linked by one or more channels adapted to supply required gas, which was not previously recirculated, into the intermediate chamber neighbouring the process chamber and then sequentially through the other intermediate chamber(s) in series as they progress away from the process chamber so as to provide a counter-current of required gas moving through the intermediate chambers in the opposite direction to the direction of passage of the web of material.

13. A process in accordance with claim 12, characterised in that the web of material (2) is porous.

14. An atmospheric pressure plasma treatment apparatus comprising the apparatus in accordance with claim 1.

15. An apparatus in accordance with claim 1 characterized in that the temperature of gas within said process chamber ranges from 20 to 70° C.

* * * * *